Oct. 10, 1950 F. C. WALLACE ET AL 2,524,861

TELEMETERING SYSTEM FOR RADIO LINKS

Filed Dec. 11, 1947 4 Sheets-Sheet 1

INVENTORS
FRED C. WALLACE
MORTIMER ROGOFF
BY
R P Morris
ATTORNEY

TELEMETERING SYSTEM FOR RADIO LINKS

INVENTORS
FRED C. WALLACE
MORTIMER ROGOFF
BY R P Morris
ATTORNEY

Oct. 10, 1950 F. C. WALLACE ET AL 2,524,861

TELEMETERING SYSTEM FOR RADIO LINKS

Filed Dec. 11, 1947 4 Sheets-Sheet 3

INVENTORS
FRED C. WALLACE
MORTIMER ROGOFF
BY
R P Morris
ATTORNEY

TELEMETERING SYSTEM FOR RADIO LINKS

Filed Dec. 11, 1947 4 Sheets-Sheet 4

INVENTORS
FRED C. WALLACE
MORTIMER ROGOFF
BY
R. P. Morris
ATTORNEY

Patented Oct. 10, 1950

2,524,861

UNITED STATES PATENT OFFICE 2,524,861

TELEMETERING SYSTEM FOR RADIO LINKS

Fred C. Wallace, Belleville, N. J., and Mortimer Rogoff, New York, N. Y., assignors to International Standard Electric Corporation, New York, N. Y., a corporation of Delaware Application December 11, 1947, Serial No. 792,920

8 Claims. (Cl. 250—15)

This invention relates to telemetering systems and more particularly to systems designed to give information regarding the operating conditions or the lack of the same at different repeater stations through which communications are to be transmitted from point to point.

Our invention is found to be particularly serviceable in connection with a pulse-time-modulation multi-channel radio installation comprising two terminal stations and one or more intermediate repeater stations. The repeater stations in many instances are unmanned and all are equipped with stand-by equipment and automatic switch over facilities so as to maintain service even though one of the repeater units fails.

In order to avoid a complete loss of communication between terminals, however, a telemetering system is essential. With it, faults can be located and maintenance crews can be dispatched to specific repeater stations, usually before the stand-by equipment fails. In case a repeater station becomes disabled from loss of primary power, such complete failure is made known at the terminals by means which are provided in our improved telemetering system.

Accordingly it is an object of our invention to provide telemetering equipment whereby a continuous indication of conditions at these repeater stations shall be available at each terminal station.

It is another object of our invention to provide an indicator panel at each of the terminal stations having indicator lamps or the equivalent which are selectively lighted in response to incoming telemetering signals and which may be used to locate a fault or failure at any one of the repeater stations.

Still another object of our invention is to provide facilities at each of the repeater stations whereby, in the event of loss of primary power, the resulting interruption of communication between terminals will not impair the telemetering display on the indicator panels at the terminal stations.

The system in connection with which our invention is illustratively described is one which has been standardized for the maintenance of as many as 23 two-way channels of communication, and which operates on a time division multiplex basis. We utilize only one of these 23 channels for telemetering, regardless of the number of repeater stations between terminals. The telemetering signals are originated at the two terminals and apply to the different repeaters successively.

The telemetering system of our invention utilizes radio frequency power as radiated from the parabolic reflector associated with a transmitting dipole antenna. A monitoring dipole in the field of the energy radiated serves to control the telemetering equipment. If normal power is being transmitted, then a "normal" telemetering signal is sent back to each terminal. When the transmitter at a given repeater station becomes inoperative, either on account of loss of primary power or because its power is unmodulated by output from the associated receiver, our telemetering system functions to indicate at the terminals which particular repeater has failed. Under certain conditions the telemetering signals are reverted from the two repeater stations next in line on the two sides of the disabled repeater. In this way the telemetering display at the two terminals is suitably set to indicate the point of failure.

Our invention will now be described in more detail, reference being made to the accompanying drawings wherein:

Fig. 1 shows diagrammatically a typical arrangement of associated terminals and repeater stations, one terminal being the north terminal and another being the south terminal. Between these terminals are repeater stations No. S1, No. S2 and No. S3;

Figs. 2*a*, 2*b* and 2*c* show diagrammatically systems producing different displays of indicator lamps on typical monitoring panels at the two terminal stations, the lamps being selectively lighted to indicate normal, one-way and two-way failure conditions, and being grouped according to the different repeater stations to which they refer.

Figure 1:
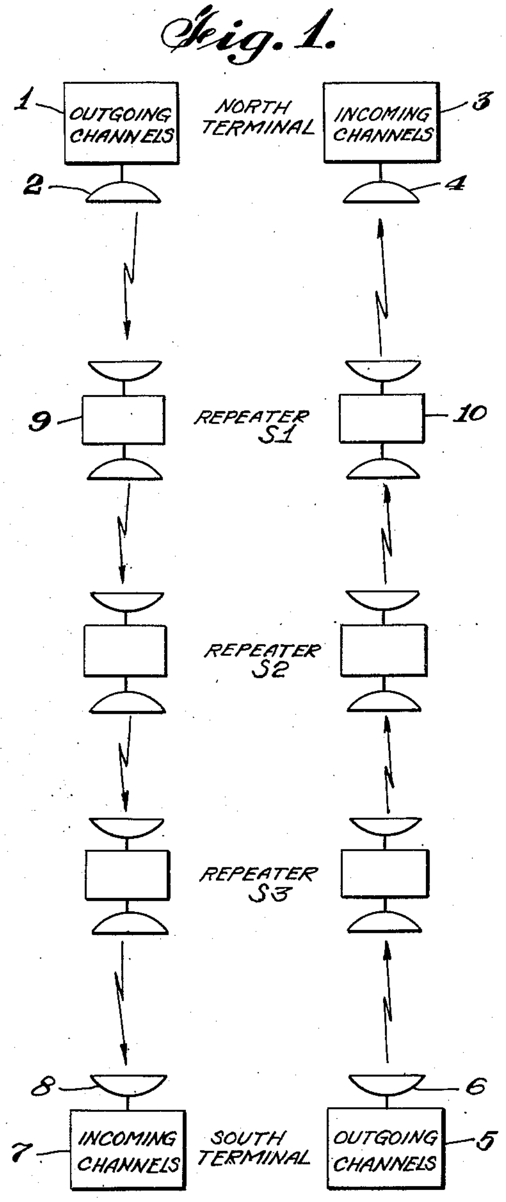

Referring first to Fig. 1, we show therein a north terminal having means 1 for transmitting intelligence over a plurality of multiplexed outgoing channels. This means is connected to a beam antenna 2. The north terminal also includes means 3 for the reception of incoming signals collected on a beam antenna 4. Similar means 5 are provided in the south terminal for the transmission of signals outgoing toward the north terminal, these signals being radiated from an antenna 6. Also the south terminal includes receiving means 7 connected to a receiving antenna 8 so that incoming signals may be collected and utilized.

Each of three typical repeater stations No. S1, No. S2 and No. S3 is represented in the block diagram in addition to the terminal stations. The equipment for signal reception and re-transmission in one direction is shown by one block at each repeater, and another block represents similar equipment for signal reception and re-transmission in the opposite direction. Thus, block 9 at repeater No. 1 represents equipment for signaling in a south-bound direction and block 10 is for signaling in a north-bound direction.

Figures 2A, 2B, 2C:
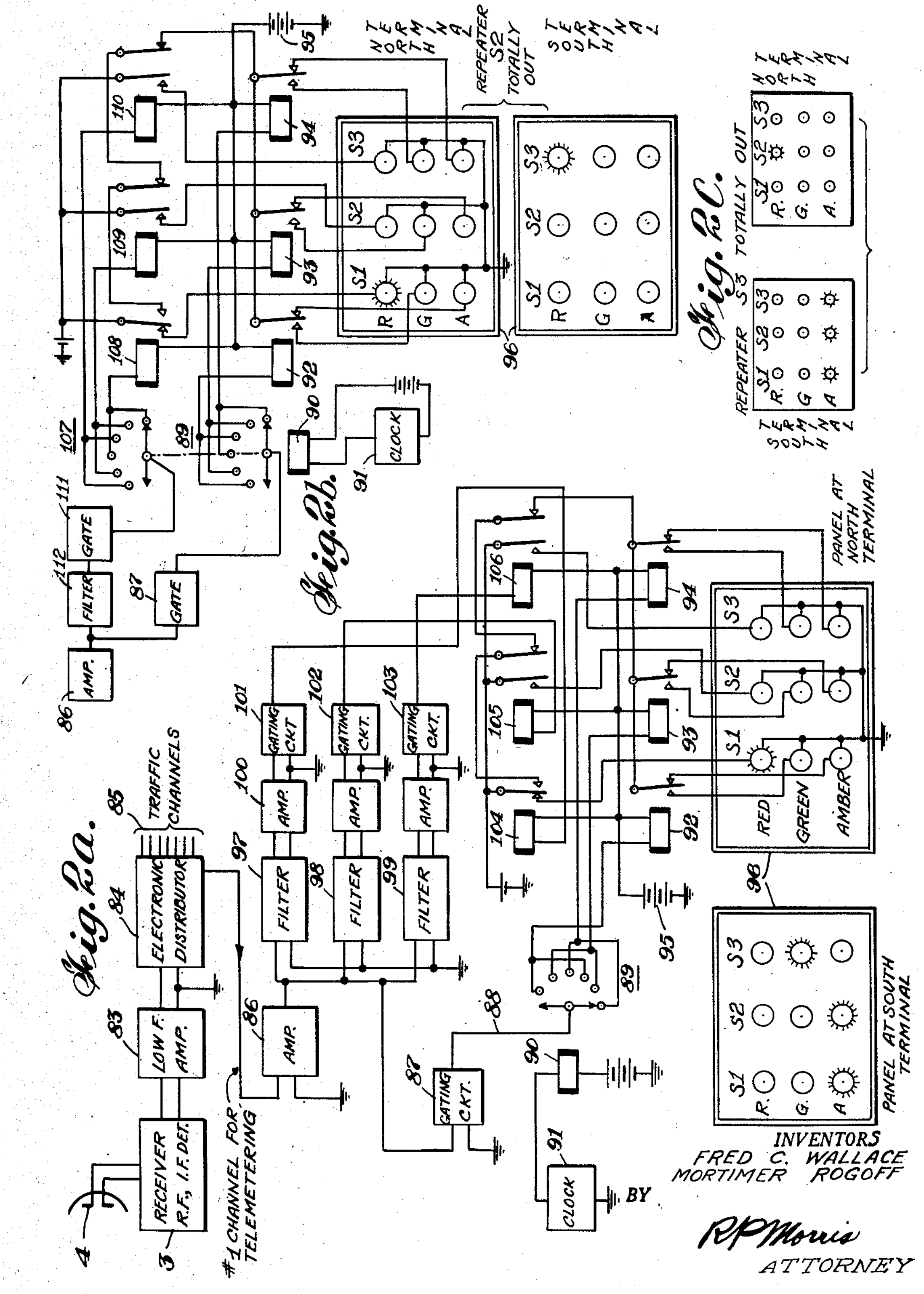
Figure 3:
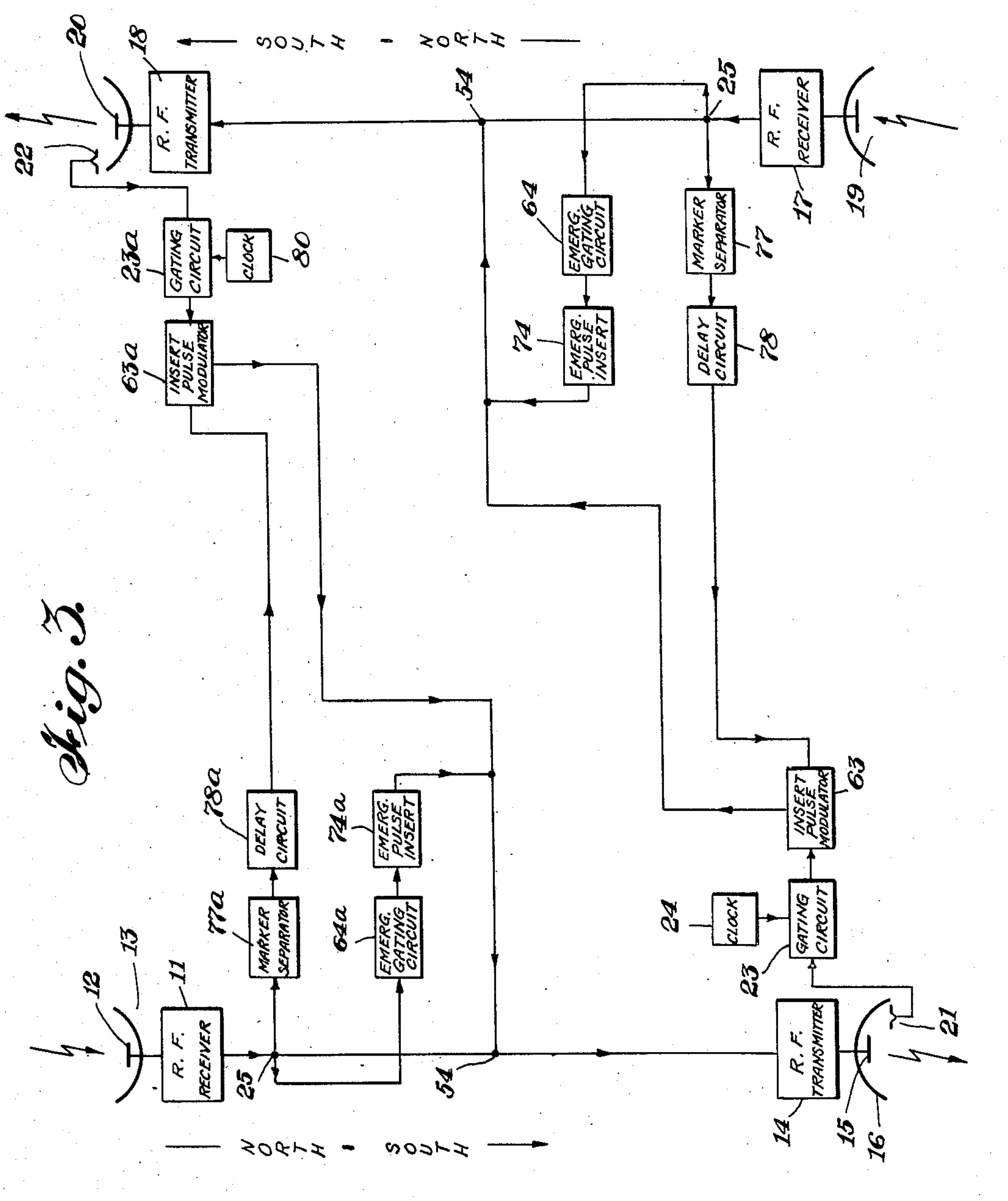
Fig. 3 shows by means of a block diagram the principal components of a telemetering system as they would be installed in a single repeater station.
Figure 4:
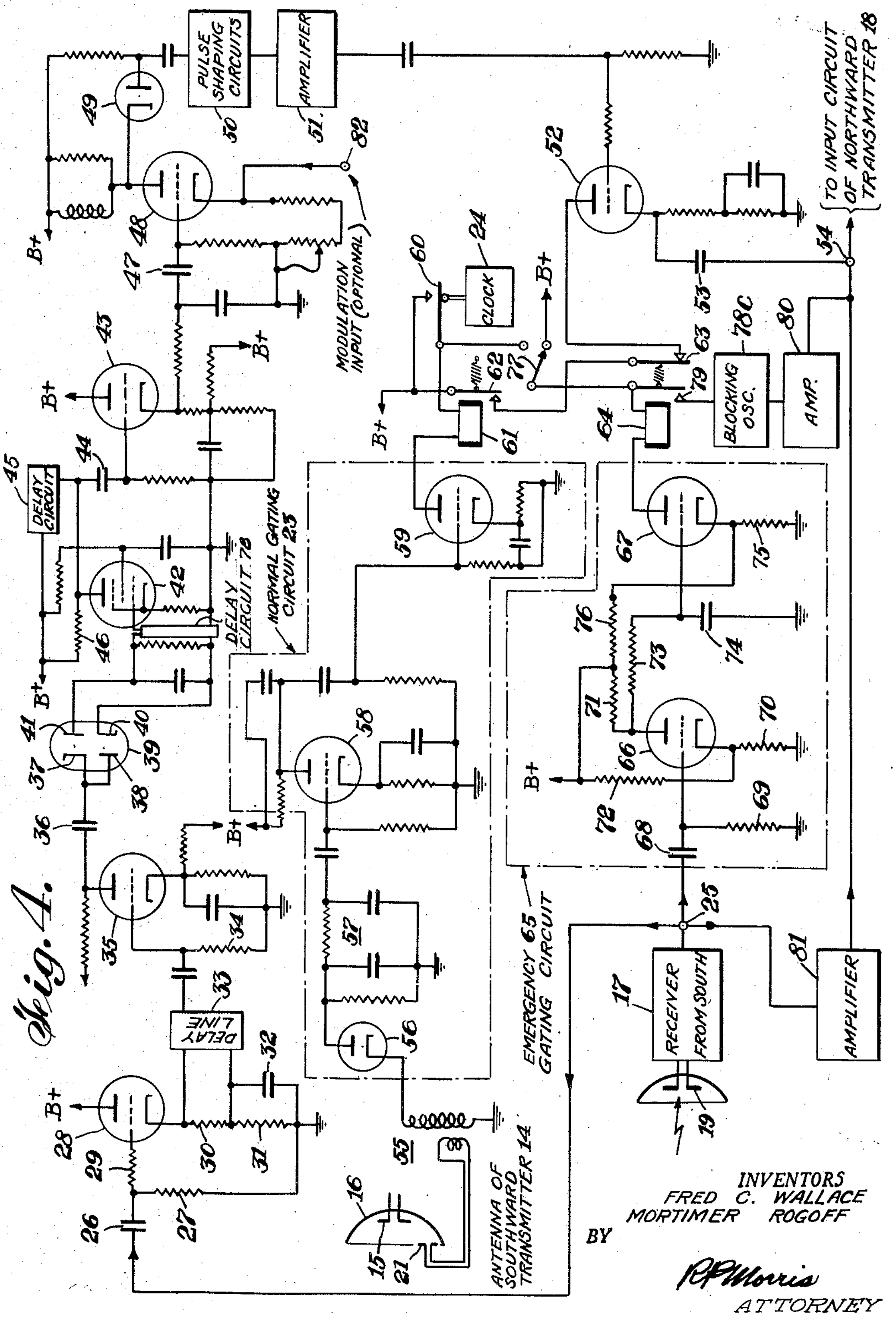
Fig. 4 shows a circuit diagram including electronic and other components of a telemetering system at a single repeater station, this diagram being referred to when explaining more in detail the mode of operation of the system.

As shown in Figs. 3 and 4 certain circuit arrangements for the telemetering system require the joint action of the repeater units as used for signaling in the two directions. If all repeaters are functioning normally, each repeater in turn will inject an impulse into the No. 1 channel of the multiplex signal train. When one-way signaling is interrupted at any repeater, either due to receiver failure or transmitter failure, this fact is indicated by the lighting of one or more yellow lamps on the display panel at the terminal where that signal train originates. A red lamp is also lighted on the display panel at the terminal toward which the signals were directed. In case of interruption of service in both directions one or more red lamps are lighted, usually at both terminal display panels. When, however, a repeater adjacent one of the terminals fails completely, all of the yellow lamps at that terminal will be lighted. These and other characteristics of the telemetering system as herein illustratively disclosed will be further explained hereinafter by reference to Figs. 2*a*, 2*b* and 2*c*.

Referring now to Fig. 3, we show therein a block diagram of a typical repeater station. The equipment includes a receiver 11 and a transmitter 14 for signaling, say, in a southerly direction, and a receiver 17 and transmitter 18 for signaling in a northerly direction. These units may, if desired, be duplicated as "stand-by" equipment when double insurance against service interruption appears necessary. The stand-by units and the means for automatically bringing them into service are not comprehended within the scope of this disclosure, and for this reason no further reference need be made to them.

The showing of communication channels north-bound and south-bound is made merely by way of example and in order to simplify the description.

For re-transmission of signals in a southerly direction receiver 11 is responsive to incoming signals from the north terminal as collected on a dipole antenna 12 at the focus of a parabolic reflector 13. The output from receiver 11 is utilized as modulation input to an R. F. transmitter 14. The output from this transmitter is to be radiated from a dipole antenna 15 at the focus of a parabolic reflector 16, which reflector is aimed toward the next repeater station or toward the south terminal.

For repeating signals which are received from a southerly point and are to be re-transmitted in a northerly direction, a receiving unit 17 is shown connected to an R. F. transmitter 18. Energy collected on the antenna 19 is fed to receiver 17 while energy outgoing from the transmitter 18 is radiated from an antenna 20.

For purposes of telemetering, a pick-up dipole such as 21 or 22 is located within the beam of energy radiated by dipoles 15 and 20 respectively. Each pick-up dipole collects a small portion of the transmitted power for the purpose of controlling a gating circuit. Considering for example, the north-south channel of transmission, the radio frequency energy from the pick-up antenna 21 is to be inserted into the telemetering gating circuit 23 where de-modulation takes place and where a supersonic pulse train is recovered.

It should be observed that we are illustrating the use of our telemetering system as associated with a well-known pulse-time-multiplex communication system. In such a system, voice frequencies are inserted and received at the terminals, while the channels at the repeaters exist as pulses having a supersonic repetition frequency which key a carrier wave.

Since the telemetering system requires one two-way channel for its operation, twenty-two two-way channels are available for traffic signals.

In order to provide the telemetering channel, the first channel pulse occuring after the marker in the pulse train is blanked. Telemetering is accomplished by inserting a channel pulse, five microseconds after the marker in sequence from the north terminal and from each repeater; thence from the south terminal and from each repeater. During the first telemetering interval, the successive "loopings" and return to the north terminal are tested; during the second interval, the same test is made with reference to the south terminal.

The essential information carried by the telemetering signal is whether or not the repeater transmitter is radiating radio frequency power. The repeater transmitting and telemetering pulse in the pulse train is located by its position in time in the telemetering cycle.

The telemetering cycle is preferably set at a rate sufficiently slow to be synchronized by an ordinary clock 24. Since the accuracy of these clocks is not of great importance to the operation of the telemetering system, they may be either mechanical clocks with self winding attachments or electric clocks working from the same or different sources of power. These clocks operate the switches which energize the telemetering equipment at each repeater in sequence along the link. Hence each repeater is given a definite interval of time in which to transmit the telemetering signals back to the terminal. Sufficient guard time between the examination of repeater conditions is allowed at the terminals to compensate for any inaccuracy in timing due to these clocks. The length of the telemetering cycle will depend on the time allotted for each repeater to transmit its telemetering signals and on the number of repeaters in the system plus the guard time required. The length of this cycle is not a critical factor. Telemetering information will be stored on the display boards at the terminals so that the indications will be continuously available.

In the event that a repeater station is completely inoperative, no telemetering signals can be looped through it. In order for the terminals to locate the position of this inoperative station along the route an emergency function is provided in the telemetering system. When the repeater station is completely inoperative there is no pulse train to be detected from an outgoing transmitter nor is there a pulse train from which the telemetering signal can be derived. Hence any telemetering signals must originate at repeaters on either side of the inoperative station. In order to handle this emergency condition, units 64 and 74, 64*a* and 74*a* are provided at each repeater. They transmit only a single characteristic pulse which identifies a particular repeater.

The emergency pulse insert equipment consists of a pulse generator 74 which is gated on by the unit 64 in the absence of a received pulse train. This pulse has a repetition rate which is characteristic of the repeater location, and is transmitted to the terminal station in place of the normal pulse train.

Transmission of the emergency pulse prevents other repeaters closer to the terminal from inserting their emergency pulses on the outgoing transmitters; hence only the repeaters on either side of the fault will be originating the emergency indication.

Referring now to Fig. 4, we show circuit details of the means for inserting telemetering pulses in the multiplex train, particularly in the time interval allotment to the No. 1 channel which follows the marker pulses. At the junction point 25 shown in Fig. 3, which junction point is also shown in Fig. 4, the output from the receiver 17 is utilized by coupling the same across a capacitor 26 and through a resistor 27 to ground, so as to control an amplifier tube 28. The control grid of this tube is connected to the junction between capacitor 26 and resistor 27 by means of a resistor 29. In the cathode circuit of tube 28, cathode resistors 30 and 31 lead to ground, resistor 31 being shunted by a capacitor 32.

In shunt with the resistor 30 we introduce an open reflecting delay line 33 which is preferably adjusted to obtain a delay, of say, 1.3 microseconds in the reflected pulse. This delay line is used in selecting a marker pulse of the double pulse type in which the two pulses forming the marker are spaced more closely together than the channel pulses. The first of the two pulses forming the marker is reflected and superimposed on the second pulse to produce a resulting pulse of greater amplitude than the channel pulses which is thereafter selected in a threshold amplifying stage. Likewise, the delay line type of selector may also be used with markers of the single pulse type in which the marker pulse is wider than the channel pulses, the delay of the reflecting delay line being less than the width of the marker pulse but greater than the width of the channel pulses. A portion of the reflected energy of this wide marker pulse is superimposed on the rest of the marker pulse to produce a pulse of greater than average amplitude which is likewise selected by a threshold stage as will be seeen from the following. The output from the delay line is then fed through a capacitor and resistor 34 and to the input circuit of a second stage threshold-biassed tube 35 which clips off and further amplifies the pulse corresponding to the marker pulse and broadens its peak. The anode of this tube is coupled across a capacitor 36 to a cathode 37 and an anode 38 in a twin diode detector tube 39. Opposed to the anode 38 is a cathode 40 which is grounded. Opposed to the cathode 37 is an anode 41 which is connected via a delay circuit 78 to the control grid in a further amplifier tube stage 42. The circuit components up to this point are also designed to prolong the marker pulse effect somewhat. The delay circuit 78 has a value equal to the spacing between the marker and the first channel position. The anode of tube 42 is coupled to the control grid of still another stage tube 43, the coupling being across a capacitor 44. The anode of tube 42 is also connected to a shorted delay line 45 which is effectively in shunt with anode resistor 46. The pulse output from tube 42 as applied to the grid of tube 43 is preferably delayed by some 8 microseconds.

The circuit components of tube 43 are such as to give the marker pulse a saw tooth shape. The output is coupled across a capacitor 47 to the control grid of a tube stage 48. In this stage the marker pulse is given a rectangular shape. The tube also has a connection to its cathode which may optionally be used for the insertion of a modulation for characterizing, if desired, the telemetering pulses in such a way as to convey certain intelligence regarding operating conditions at a given relay station. For example, if it is desired to indicate that the primary equipment has failed and the stand-by equipment has been "switched in" then a certain characteristic modulation may be applied for indicating this condition. This modulation may be width modulation produced under control of the amplitude of the modulating signal, which may be translated into displacement modulation at the output from tube 48 by differentiation and by rectification by means of a diode tube 49, or possibly by alternative means such as a crystal detector. This output eventually becomes the telemetering signal but is first subjected to further pulse shaping in conventional pulse shaping circuits indicated by the unit 50.

Various circuit components shown in Fig. 4 but not described in detail have for their purpose the differentiating of the pulses and the shortening of the pulse effects to the extent of possibly 1 microsecond in order that this pulse may not drift unduly to one side or the other of the time allotment of the No. 1 telemetering channel.

The output from the pulse shaping circuits is now suitably characterized for injection into the No. 1 channel of the north-bound multiplex signal train. The pulse is amplified in the unit 51 and then carried to a cathode follower tube 52, the cathode of which is coupled across a capacitor 53 to a junction 54 with the input circuit leading to transmitter 18.

Tube 52 is normally blocked and will pass the normal telemetering pulse to transmitter 18 only during time allotments assigned to a given repeater by its clock 24 and only when signal energy is radiated southwardly. The cooperation between the clock 24 and the normal gating circuit 23 is as follows:

This gating circuit is controlled by energy picked up on a small dipole antenna 21 adjacent the parabolic reflector 16 of the transmitting antenna 15. The radio frequency signal so obtained is fed through a transformer 55 and through a crystal or other detector 56, the output from which is passed through a filter unit 57 and is then fed through two amplifier stages 58 and 59. But the tube in stage 59 is supplied with anode potential only upon closure of contacts 60 by the clock 24. +B potential is connected to the anode of said tube by way of clock-controlled contacts 60 and the winding of a relay 61. Contacts 62 of relay 61 and contacts 63 of another relay 64 are series-connected in the anode circuit for tube 52. Relay 64 is controlled by an emergency gating circuit 65 and is energized only upon failure of the receiver 17 to deliver the northbound signal train. Contacts 63 of relay 64 are normally closed.

The emergency gating circuit 65 is provided for the purpose of causing the transmission of a warning signal from the repeater nearest to the one that has failed. The warning signal is distinctly characterized by its tone frequency or otherwise, so as to identify the repeater from which it originates. Since there is no signal train into which it may be inserted, it may take the form of a steady tone. Or it may be sent out intermittently during times when switched on by the clock 24.

The emergency gating circuit comprises two amplifier stages having discharge tubes 66 and 67 respectively. Tube 66 is maintained conductive by a component of output energy from the receiver 17 which is fed to junction 25 and thence across a coupling capacitor 68 to the grid of tube 66. Assuming that tube 66 is a triode as shown (although the tube type is unimportant), its electrode connections may include a grounded grid resistor 69, a grounded cathode resistor 70, and an anode resistor 71 connected to the +B supply. A resistor 72 of high ohmic value may also be used in connection between the +B supply and the cathode in order to provide a threshold bias which will cause the tube to be blocked when, due to a lack of signal energy input, there is no appreciable potential drop in resistor 69.

Tube 67 has its control grid D. C. coupled to the anode of tube 66 through a resistor 73, and this resistor is also connected in series with a capacitor 74 having a ground connection, thus forming a time-constant circuit for normally maintaining tube 67 biased to cut-off. The cathode of this tube is connected to ground through a cathode resistor 75, and also is provided with a threshold biasing resistor 76 of high ohmic value connected to the +B supply. Anode potential is fed from the +B source preferably through a manual switch 77 and thence through the winding of relay 64 to the anode of tube 67.

The setting of the switch 77 in the position shown enables the emergency telemetering signal to be transmitted uninterruptedly, commencing with the failure of signal reception at receiver 17. If desired, however, the switch 77 may be set on its upper stationary contact, in which case the emergency signal would be transmitted intermittently under control of the clock-operated contacts 60. In either case the emergency signal is produced by a blocking oscillator 78c or other tone-frequency generator which may be activated by the application of +B potential thereto. This is accomplished when tube 67 is rendered conductive by the blocking of tube 66. The space current through tube 67 also traverses the winding of relay 64 and energizes the same. This relay has make-contacts 79 through which power is supplied to the oscillator 78c. The brake contacts 63 open and prevent the activation of tube 52. The generated output from the oscillator may be amplified in the unit 80, the output from which is then fed to junction 54 and thence to the input circuit of the northward transmitter 18.

The telemetering equipment which is provided at each repeater station as above described enables the different repeaters one after another to automatically report existing conditions so as to keep the personnel at the terminal stations advised. Essentially there are three alternative conditions to be reported, thus: (A) Two-way traffic is going through the repeater. This is indicated by the insertion of the telemetering pulse into the No. 1 channel of each pulse train, both north-bound and south-bound. (B) Traffic is interrupted in one direction, say south-bound. Since the north-bound signal train is still going through it will be received at the north terminal, but the telemetering pulse that is normally injected into the No. 1 channel is missing. The pulse is shut out by failure of the normal gating circuit 23 to function. The south terminal will at the same time receive the emergency signal in place of the normal traffic signals. (C) Some repeater is completely shut down. Then the repeaters adjacent thereto on the two relay paths will each initiate emergency signals because their emergency gating circuits will not be restrained by incoming signals.

It should be noted that relay 61 is mechanically biased for marginal operation so as to remain inactive until tube 59 becomes fully unblocked. Likewise, relay 64 is mechanically biased for marginal operation and for the same reason.

Traffic and telemetering signals when normally received on the receiving antenna 19 and passed through the receiver unit 17 to junction point 25 are preferably fed through a buffer amplifier 81 and then passed along through junction point 54 to the input circuit of the northward transmitter 18.

While the essential information carried by the telemetering signals is whether or not any particular repeater is fully functioning, partially functioning or completely shut down, and while the means for transmitting such signals have been fully disclosed in the foregoing part of the specification, nevertheless it will be readily understood by those skilled in the art that other intelligence may at the same time be transmitted either when applying the normal telemetering pulse to the No. 1 channel, or when transmitting the emergency signal.

Assume, for example, that a certain repeater has switched from primary equipment to standby equipment. It is desirable to convey that information to one of the terminal stations. In that case the No. 1 channel occupied by the telemetering pulses may have such pulses modulated at a frequency lower than the cycling repetition rate of the multiplex signal train. This is quite feasible, considering that it is usual to fix that cyclic rate at a supersonic frequency in order to obtain sufficient points of sampling of a telephonic voice signal by successive pulses in each particular channel of the multiplex train. The pulse rate may be of the order of 200,000 per second. So the telemetering signal modulation may be automatically applied by well known means, and may, for example, be in the form of an audible frequency tone, or a code of mark-and-space pulses that can be listened to in a head-set telephone receiver. Suitable code signals may also be applied to the emergency tone wave by keying the same.

For the purpose of modulating the normal telemetering pulses a terminal 82 is shown in Fig. 4, whereby the modulations may be applied to the cathode of tube 48. Modulation or keying of the emergency tone signal output from the oscillator 78c may also be accomplished by including a mixer tube in the amplifier unit 80.

Referring now to Fig. 2a we show therein a schematic diagram of essential equipment to be used at a terminal station for reception, interpretation and posting of information relative to the telemetering signals. The signal energy is collected by the antenna 4 and brought into a receiver 3, which is preferably designed for the reception of a very high frequency carrier wave modulated by the pulses of a multiplex signal train. The pulses after detection are fed through an amplifier 83 and thence to an electronic distributor 84. Here the marker pulse is utilized for purposes of synchronization, the traffic pulses are distributed to their respective utilization channels 85, and the telemetering pulse which is normally applied to the No. 1 channel is directed into an amplifier 86.

The normal telemetering pulses when delivered as output from the amplifier 86 are utilized in a gating circuit 87 which is designed to respond to such pulses. This gating circuit is also adapted to operate as an electronic relay, like those previously described as components of the telemetering equipment at the repeater stations. Its output may, therefore, be fed via line 88 to the contact arm of a magnetic relay 89.

It will be remembered that each repeater station is alloted a distinct time interval in which to transmit its telemetering signal. The time intervals alloted to different repeater stations are also separated by periods of "guard" time so as to avoid incorrect utilization of the telemetering signals at the terminal station. The guard time is equivalent to a spacing interval. It is during such intervals that it is necessary to operate a rotary switch 89, or the equivalent, in order to control different indicating means by successive telemetering signals.

The rotary switch is advanced step-by-step by means of a motor-magnet 90 the energizing circuit of which is controlled by a clock 91. The stepping cadence is adjusted to agree substantially with the time interval allotments to the different repeater stations. The contact bank of the rotary switch 89 is swept by a wiper which is series-connected in the anode circuit of the gating means 87.

Energizing circuits for different magnetic relays 92, 93 and 94 are terminated at respectively different contacts in the bank of rotary switch 89. These relays have a common feeder line from a direct current source 95. They, therefore, respond successively to the normal telemetering pulses as long as all of the repeater stations are functioning normally. The relays also have a slow-release characteristic such that they will hold from one moment of actuation to another; or during the time it takes for the rotary switch to pass over contacts appropriate to other repeater stations. If the number of contacts in the rotary switch bank is equal to some integral multiple of the number of repeater stations in the system, then the contacts of one series may be individually tied to those of another series, as shown in the drawing. However, as is well known, the rotary switch may be rapidly "buzzed" around to the start of a useful series of contacts as soon as it has finished that series and has reached idle contacts not corresponding to any of the repeater stations. A second contact bank and self-interrupter springs in circuit with the motor magnet 90 are then employed, as is conventional.

An indicator display panel 96 may comprise a plurality of lamps, preferably arranged in three rows, and in each row a lamp corresponding to a different one of the repeater stations. As shown in Fig. 2a the top row has red lamps for indicating emergency conditions, or responses to the emergency signal. The middle horizontal row of lamps is used for indicating normal two-way operation of the respectively different repeater stations. The lamps in this row are preferably green. The lamps in the bottom row are preferably yellow or amber and are made responsive to one-way signaling conditions and they are controlled in such manner that one or more of them will be lighted at the terminal station still receiving a signal train and according to the number of them which are so lighted an indication is made as to the proximity of the repeater station which has failed to repeat outgoing signals from that terminal station. The lighting of these amber lamps is complementary to the lighting of the green lamps, but when the circuit arrangement through the relay contacts of Fig. 2a is adopted all green and amber lamps are extinguished upon lighting any one or more of the red lamps, as they would then serve no useful purpose.

It was mentioned above that the equipment at each repeater station may include a switch 77 whereby one of two ways of transmitting the emergency signal might be adopted. If these switches at all repeater stations are set on their lower stationary contacts, then the emergency signal is transmitted as a continuous tone wave and is not identifiable as to its source unless distinctly characterized by its frequency or by a keying code which would be different for each repeater. If, however, it is desired to identify the emergency signal by the clock-controlled time intervals alloted to each repeater station, then the switches 77 would all be set on their upper stationary contacts. In this case the equipment at the terminal stations for responding to such signals may be as shown in Fig. 2b. This will be described, however, after completing the description of Fig. 2a.

When the emergency signal is received, characterized by a certain tone frequency modulation, it is distributed the same as the normal telemetering signal and is amplified in the amplifier unit 86. A plurality of filter units 97, 98 and 99 have their input circuits connected in parallel to receive output energy from the amplifier 86. These are band-pass filters which will reject all tone frequencies except the one to which each is respectively resonant. The output circuits from the filters are individually amplified in units such as the amplifier 100.

The emergency signal is then fed to one or another of a group of gating tubes 101, 102, 103. By means of these gating tubes (which may, if desired, be similar to tubes 59 and 67 in Fig. 4) any one of relays 104, 105, 106 may be energized. These relays are respectively associated with lamp circuits in the following manner: The indicating lamps for response to emergency signals are in the top row of the panel 96 and are preferably provided with red crystals to indicate an emergency condition at a given repeater station.

It will be remembered, however, that if a given repeater station receives no signal train from which a telemetering pulse may be derived, its emergency gating circuit 65 will go into action and send out the emergency signal. Assume that operative repeater No. 1 receives no signals from repeater No. 2 It then transmits an emergency signal toward the north terminal. The red lamp for repeater station No. 1 will be lit by the reception of an emergency tone signal filtered through filter 97 and causing relay 104 to be energized. This closes the red lamp circuit through the relay contacts.

If repeater station No. 3 is disabled for transmitting signals in a northerly direction, then the emergency signal would be sent out from station No. 2 and in this case filter 98, would pass the tone frequency so transmitted and would cause relay 105 to operate for lighting up the red lamp in the position corresponding to repeater station No. 2.

It would be optional whether or not means were provided for suppressing the effects of emergency signals upon the gating circuit 87 such as by the use of a suitable reject filter. This filter if used would be designed to pass the normal telemetering pulse by which the gating circuit 87 is actuated, as hereinabove described. As a substitute for the reject filtering means between the amplifier 86 and the gating means 87 we have provided a feeder circuit for the contacts of relays 92, 93, 94 such that none of these contacts are fed with battery potential for the lighting of green and amber lamps when any of the relays 104, 105 or 106 is energized. The lighting of a red lamp is sufficient indication as to where a break-down has occurred in the repeater chain. The inoperative repeater is one station beyond the station from which the emergency signal is sent out, so the lamp circuits for amber and green lamps are automatically extinguished by the reception of the emergency signal. The lighting of the green lamps to indicate two-way operation at each of the repeater stations is complementary to the lighting of the amber lamps. An amber lamp is lighted whenever one of the relays 92, 93 and 94 releases. The transmission of a signal train having a telemetering pulse in the No. 1 channel is indicated by the lighting of a corresponding amber lamp on panel 96.

Referring now to Fig. 2*b*, we show a modification wherein the clock-controlled rotary switch is equipped not only with a bank of contacts 89, but also with a second bank 107. The contacts of bank 107 lead respectively to relays 108, 109 and 110. Each of these relays corresponds with one of the repeater stations. The wiper on contact bank 107 is connected to the output side of a gating circuit 111, this gating circuit being controlled by emergency signal energy which may be filtered through the filter 112. This energy is derived from the amplifier 86 as in the case of the embodiment shown in Fig. 2*a*. The input to amplifier 86 will be understood to be the same in Fig. 2*b* as in Fig. 2*a*.

The sole filter 112 is designed to pass a certain tone frequency which may be the same for all repeater stations. So the emergency signal regardless of its origin may be used to operate a single gating device 111. Relays 108, 109 and 110 are individually selected for response to the emergency signal by virtue of the timing of the emergency signal as sent out by any particular repeater station. The timing is in accordance with the clocks 24. as has been explained in reference to Fig. 4. At the terminal station the operation of the rotary switch is controlled by clock 91 which in turn is synchronized with the clocks at the repeater stations.

Relays 92, 93 and 94 function the same in Fig. 2*b* as in Fig. 2*a*. Each one closes a green lamp circuit through its front contact to indicate a response to the normal telemetering signal. Upon failure of this signal to come through, the relay is released which corresponds to the repeater station that has failed. Each relay upon release closes an amber lamp circuit through its back contact, unless such a circuit is elsewhere opened by one of the emergency signal relays 108, 109 or 110. The potential source for lighting all of the lamps has one terminal grounded and the other terminal connected to a movable contact on each of the relays 108, 109 and 110. Back contacts of these relays, together with additional movable contacts on relays 109 and 110 form a series circuit which may be opened whenever any one of the emergency signals comes in, so that all green and amber lamps may be extinguished.

All of the relays are preferably of the slow-release type and their holding time is sufficient to maintain circuit closures for the lamps during the cycle-time of testing all of the repeater stations successively. This gives a continuous indication of operating conditions at each repeater.

The circuit arrangements as shown in Figs. 2*a* and 2*b* may be modified in various ways in order to meet different requirements of telemetering. The showing of these figures is, therefore, intended to be merely suggestive of practical ways and means for interpreting the telemetering signals.

The indicator panel at the north terminal as shown in Fig. 2*a* represents a failure of operating conditions in the northbound signaling path at repeater station No. S2. The No. 1 red lamp is lit because the emergency signal is originated at repeater station No. S1.

At the south terminal a different showing is made on the indicator panel. There the signal train is coming through from the north terminal, but since the northbound transmitter at repeater No. S2 is assumed to have failed, the normal telemetering pulse can not be injected into the southbound signal train due to the fact that the gating circuit 23*a* at repeater No. S2 restrains the operation of the insert-pulse-modulator 63*a* (Fig. 3). Consequently, there is no telemetering pulse present in the signal train, either as it would be applied to the indicator lamp for repeater No. S1 or for No. S2. Only at repeater No. S3 is the telemetering signal looped because the gating circuit 23*a* at that repeater is operative to control the insert-pulse-modulator 63*a*.

Fig. 2*b* shows panel indications at the two terminals when a complete failure has occurred at repeater No. S2. Repeater No. S1 then transmits the emergency signal northbound and causes the lighting of the red lamp in the No. 1 position. Likewise repeater No. S3 transmits an emergency signal southbound and causes the red lamp to be lit in the No. 3 position. In either case the indication would be interpreted as a failure at repeater No. S2.

The panel indications at the north and south terminals as shown in Fig. 2*c* represent a condition wherein there is a complete shut-down at repeater No. S3. Here again the indications are different at the two terminals because of the remoteness of repeater No. S3 from the north terminal and the proximity of the same to the south terminal. At neither of the terminal stations is it possible to receive any normal signal train. The emergency signal is, however, injected into the northbound transmission from repeater No. S2 and this causes the red lamp corresponding to that station to be lighted at the panel of the north terminal. The southbound transmission path is completely cut off at repeater No. S3, in consequence of which the south terminal receives no signals whatsoever. At the south terminal, therefore, all relays controlling the panel lamps are released and circuit closures are made through the back contacts of relays 92, 93 and 94. These circuit closures cause all three of the amber lamps to be lit. This indication obviously means that the failure has occurred at the repeater nearest the terminal.

It will be apparent from the foregoing discussion that suitable indications are made at one or the other of the panels of the two terminal stations for supplying what information may be needed with regard to repeater station failures, either partial or complete. An analysis of all possible conditions of failure further than what has been given above seems, therefore, unnecessary since these conditions may be readily understood in view of what has been stated and shown in the drawings.

It will be apparent to those skilled in the art that various modifications of our invention will suggest themselves in view of the disclosure as above outlined. Such modifications would, however, be comprehended within the scope of the invention itself.

We claim:

1. A telemetering device for use in connection with a two-way pulse-modulation system having repeater stations, said device comprising a circuit for separating marker pulses from other pulses in a pulse train, delay circuit means for deriving from the marker pulse a telemetering pulse, a pulse injector circuit arranged and adapted to apply said telemetering pulse to an idle channel in said pulse train, timing means for allocating different telemetering periods to different repeater stations, a gating circuit subject to closure by said timing means for causing said injector circuit to function, and indicator means located adjacent the source of said second pulse train for producing a response to said telemetering pulse.

2. A device according to claim 1 and including a tone frequency generator at each repeater station, a second gating circuit at each repeater station operable to cause the activation of said generator, and a holding circuit operative to prevent the operation of said second gating circuit until a failure occurs in the reception of said pulse train, said second gating circuit being also effective to cause the transmission of an emergency signal modulated by output from said generator.

3. A device according to claim 1 and including in said indicator means time-controlled switching apparatus arranged and adapted to produce different responses to successive telemetering pulses according to the telemetering periods which are assigned to different repeater stations.

4. A telemetering system for indicating at a terminal station the existence of one or another of several alternative operating conditions at a repeater station, said system comprising pulse-segregating means operative to segregate the marker pulse in a pulse-modulated signal train, delay means for producing a delayed effect from the product of said segregating means and pulse injecting means controlled by said delay means for applying a telemetering pulse to an otherwise unoccupied channel in said signal train.

5. A system according to claim 4 and for use in association with a two-way installation where signals are normally concurrently transmitted from each of two terminal stations through said repeater station in opposite directions, said system also comprising gating means subject to control in the presence of signal energy transmitted in one direction for conditioning said pulse injecting means to inject said telemetering pulse into the signal train which is transmitted in the opposite direction.

6. In a radio repeater station having two-way signal repeating equipment, a first relay for releasing a normal telemetering pulse, a second relay for releasing an emergency signal, two electronic gating circuits, each for controlling a respective one of said relays, timing means for conditioning said repeater station to intermittently transmit telemetering signals, an electronic circuit arrangement adapted to extract a component of pulse energy from a given pulse train and to reinsert it at a different part of the same pulse train, thereby to develop a telemetering pulse, circuit means controlled by the first said relay for causing said telemetering pulse to be transmitted in a given direction whenever said signal equipment functions normally to transmit signals in both directions and circuit means including an emergency signal generator controlled by the second said relay for causing said emergency signal to be transmitted in a direction opposed to that in which a transmission failure has occurred, which failure is responded to by a functioning of the gating circuit that controls said second relay.

7. A telemetering device for use in association with a two-way pulse modulation system having repeater stations, said device being located at one of the terminal stations of said system and comprising an indicator panel having a group of indicator lamps corresponding to each repeater station, at least three lamps in each group for indicating alternative repeater station conditions according to the characteristic of a communications channel in which telemetering signals are transmitted, signal receiving and translating means responsive to said signals, a distributor for channeling the signals into different units of said translating means, relays in said translating means operable under control of the signals to maintain one or another of the three lamps in each group lighted, whereby the conditions of operation which prevail at each repeater station will be indicated, filter means operable to channel different signals into different paths of said translating means corresponding to respectively different groups of lamps, and gating circuits operable under control of signal energy passed by said filter means for causing the actuation of certain of said relays, thereby to maintain a particular lamp lighted in a selected group for indicating an operational failure at a certain repeater station.

8. A telemetering device for use in association with a two-way pulse modulation system having repeater stations, said device being located at one of the terminal stations of said system and comprising an indicator panel having a group of indicator lamps corresponding to each repeater station, at least three lamps in each group for indicating alternative repeater station conditions according to the characteristic of a communications channel in which telemetering signals are transmitted, signal receiving and translating means responsive to said signals, a distributor for channeling the signals into different units of said translating means, relays in said translating means operable under control of the signals to maintain one or another of the three lamps in each group lighted, whereby the conditions of operation which prevail at each repeater station will be indicated, filter means operable to pass a certain type of said telemetering signals and to suppress a second type thereof, gating means whereby, with reference to the relays controlling a particular group of lamps, one relay is rendered responsive to signals which are filter-passed, this relay being effective to maintain a particular lamp lighted, and a second relay is effective in response to a signal of said second type which is shunted around said filter means to maintain another particular lamp lighted, provided that said one relay does not operate, and a circuit for maintaining the third of said lamps lighted when both the two said relays are released.

FRED C. WALLACE.
MORTIMER ROGOFF.

REFERENCES CITED

The following references are of record in the file of this patent:

UNITED STATES PATENTS

| Number | Name | Date |
|---|---|---|
| 2,039,404 | Green et al. | May 5, 1936 |
| 2,039,405 | Green et al. | May 5, 1936 |
| 2,250,950 | Goldsmith | July 29, 1941 |
| 2,257,094 | Goldstine | Sept. 30, 1941 |
| 2,296,384 | Hansell | Sept. 22, 1942 |